Aug. 11, 1931.  R. E. DUPLESSIS  1,818,051
DEVICE FOR SUPPLYING FASTENINGS
Filed Oct. 5, 1928
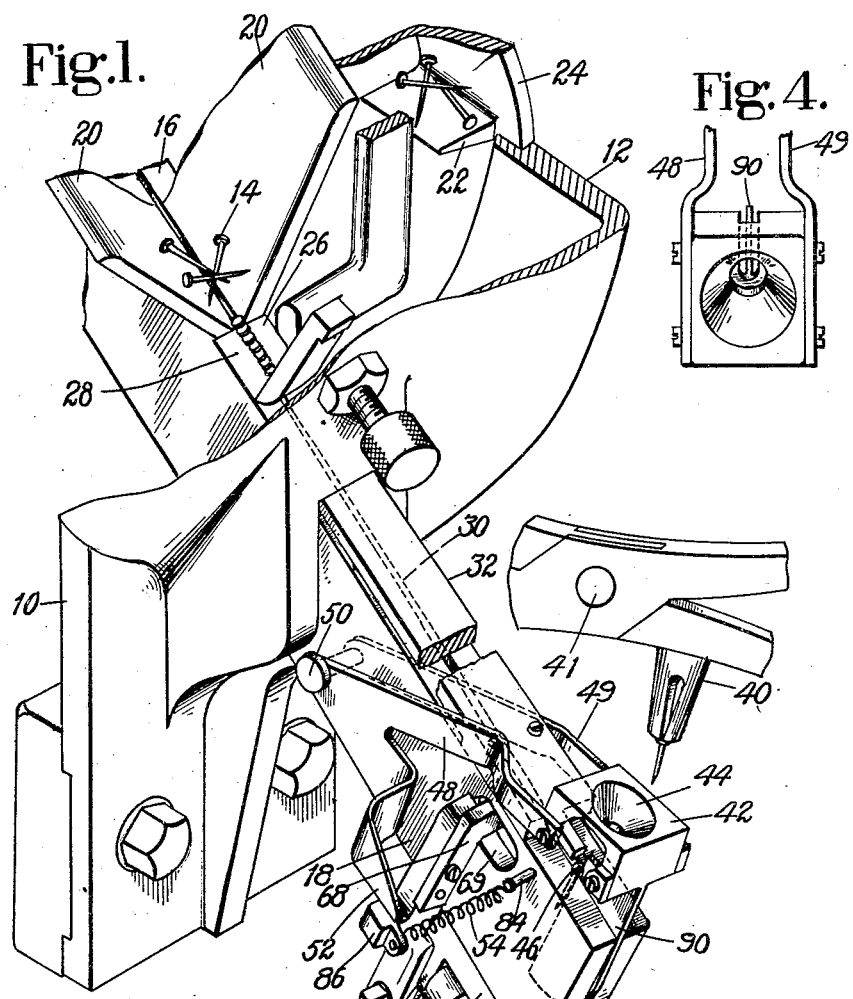
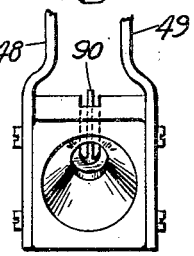
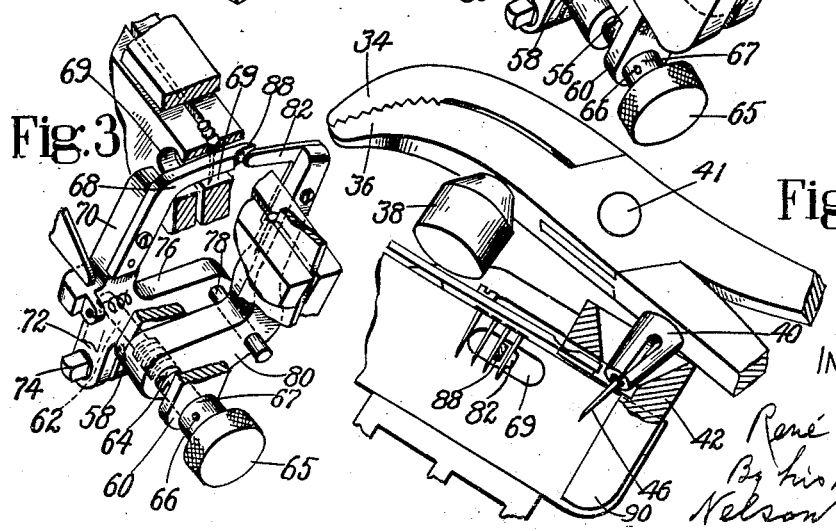
INVENTOR.
René E. Duplessis
By his Attorney,
Nelson W. Howard Patented Aug. 11, 1931

1,818,051

UNITED STATES PATENT OFFICE

RENÉ E. DUPLESSIS, OF BEVERLY, MASSACHUSETTS, ASSIGNOR TO UNITED SHOE MACHINERY CORPORATION, OF PATERSON, NEW JERSEY, A CORPORATION OF NEW JERSEY

DEVICE FOR SUPPLYING FASTENINGS

Application filed October 5, 1928. Serial No. 310,555.

This invention relates to a device for supplying fastenings and is illustrated herein as embodied in a device arranged to supply tacks one by one in such a manner that they can be conveniently picked up, for example, by a portable magnetic implement, and transferred to the place where they are to be driven.

Tacks are frequently driven by hand in the manufacture of shoes and it has been the practice of operators, particularly side lasters, to employ the unpleasant and unsanitary practice of keeping their supply of tacks in their mouths, as they have found that they can take the tacks from their mouths more easily and quickly than they can pick them from a receptacle.

It has been proposed, in order to do away with this unsanitary practice, to pick the tacks up by a magnetic implement from a raceway to which tacks are supplied from a suitable tack hopper. Such a device is illustracted in United States Letters Patent No. 1,761,031, granted June 3, 1930.

It is an object of the present invention to improve upon the construction shown in said application by providing means for guiding a magnetic implement to a fastening to be picked up so that the operator need not watch carefully where he positions the implement for this purpose but, after the magnetic implement is brought into contact with a conveniently formed and positioned guiding member, this member will guide the magnetic implement directly to the fastening without further care or effort upon the operator's part.

Another object of the invention is to improve further upon the construction shown in said application by arranging the mechanism so that the parts that the operator is required to move to operate the fastening separating mechanism are lighter in weight and easier to operate than the raceway which was moved by the operator in the prior construction.

Another object of the invention is to assure the positioning of the fastening centrally with respect to the magnetic field of the magnet so that the attraction of the magnet for the fastening will be as great as possible, whereby the operator is assured that a fastening will be firmly retained by the magnet until he drives it preliminary into the desired position in the work. Such driving is also facilitated by the fact that the fastening is centrally located on the driving implement.

A still further object of the invention is to provide a mechanism capable of being arranged to handle fastenings of different sizes.

To the accomplishment of the above and other objects, a feature of the invention consists in a block having an aperture for receiving the magnetic implement, which block is depressed in a definite path of travel by the implement as the implement is moved toward the raceway, until the implement is guided to the fastening which it is desired to pick up. An advantage of this feature of the construction is the certainty with which one of the objects of the invention is attained; viz.,— the magnetic implement is guided to a position where it picks up the fastening so that it is centrally located with respect to the poles of the magnet, where the magnetic field and the holding power are greatest and from which position the preliminary driving of the fastening is facilitated.

Another feature of the invention consists in connections between this guiding block and the tack separating mechanism so that movement of the block as the magnetic implement is carried to and from fastening receiving position will operate the fastening separating mechanism and always feed a fastening to take the place of the one removed by the magnetic implement, without the necessity of moving the comparatively heavy raceway.

A further feature of the invention comprises means for conveniently adjusting the fastening separating mechanism to take care of fastenings of various sizes.

Although, for convenience, the invention is illustrated and hereinafter described as being arranged for use in handling tacks, it should be understood that the invention is not so limited but it may be used with various other kinds of fastenings.

With the above and other objects and features in view, the invention will now be described in detail with reference to the accompanying drawings and pointed out in the claims.

In the drawings,

Fig. 1 is a perspective view of the device for supplying fastenings arranged in accordance with the present invention;

Fig. 2 is a side elevation, partly in section, showing the lower end of the raceway, the magnet carried by the lasting pincers and the depressible means for guiding the magnet to a tack;

Fig. 3 is a view of the tack separating mechanism, with related parts partly broken away; and Fig. 4 is a view of the depressible guide from a point vertically above it.

The fastening supply device of Fig. 1 is carried by a bracket 10 forming part of or carrying a hopper or tack pot 12 by which fastenings 14 may be supplied in any suitable manner to the upper end 16 of a raceway 18 illustrated as provided at its upper end with a pair of diverging plates 20 directing the tacks to the raceway as they fall from plates 22 carried by a rotating portion 24 of the hopper 12. The raceway 18 is made up of a pair of plates 26, 28 spaced apart to form a tack receiving slot 30 and provided with a suitable cover 32 secured to the plates 26, 28. The above parts may be of any suitable construction and are shown as constructed in the manner shown in said application of J. F. Alkonis, with the exception of the details of construction at the lower end of the raceway and with the exception, also, that the raceway is fixed and not pivotally movable.

When this device is used in connection with machines for lasting shoes, magnetic lasting pincers, such as shown in the Alkonis application, are intended to be used with it. These lasting pincers are provided with the usual gripping jaws 34 and 36 and have the usual tack hammer 38 attached to the lower jaw 36. The magnet for picking up a tack is shown at 40 and is mounted on the underside of the pincers, being secured to the member upon which the upper jaw is formed, but beyond the pivot 41 where the jaws cross each other. When the present invention is used for other work than lasting, the magnet 40 may be mounted upon any other suitable portable implement, such as a hammer.

In order to guide the magnet positively to the tack to be picked up, a depressible implement guide or block 42 is provided. This block is provided with a frusto-conical implement guiding and receiving aperture 44 which renders it easy for the operator, after moving the magnetic implement into approximate position, to guide it into the exact position above, and depress it into contact with, the tack 46 to be picked up from the raceway.

In the illustrated construction, the depressible guide 42 is carried upon and its path of travel is determined by, supporting arms or members 48 and 49 located, one on each side of the raceway and pivoted thereto at 50. Integral with the arm 48 is an off-set extension 52 which operates a tack separating mechanism. As the tack-separating mechanism is normally maintained in a given position by a spring 54, in a manner which will later be described, this spring, acting through the separator mechanism, maintains the implement guide in raised position, except when it is depressed by the operator as he brings the magnetic implement into contact therewith.

The tack separating mechanism, although more easily operated, is broadly similar to that disclosed in said application Serial No. 246,846, filed in the name of Alkonis, but it is an improvement thereon, as it is provided with means for adjusting it for different sizes of tacks. The tack separating mechanism is mounted on a downward extension 56 of the raceway. This extension is provided with two bearing lugs 58 and 60 in which is mounted a short shaft 62 having a threaded portion 64 and provided with a knurled head 65 which is secured to the shaft by a pin 66. The hub 67 of the knurled head abuts against the bearing lug 60 and assists in maintaining the shaft in fixed longitudinal position, as will appear later. The inner tack separating member consists of a bent finger 68 which passes through slots 69 in the raceway plates 26 and 28. This finger 68 is mounted upon an arm 70 of a bell crank lever. This bell crank lever is provided with an integral clamp collar 72 through which, after the mechanism has been adjusted for the desired size of tack in the manner about to be described, it may be clamped, by means of a clamp screw 74, to the shaft 62 in a position where its side abuts against the bearing lug 58. The bell crank lever is provided with another arm 76 carrying a fixed guiding pin 78 which is parallel to the shaft 62 and which prevents relative rotation between the arm 76 and a separately mounted arm 80 through which the pin freely passes, while permitting bodily movement of separation between the bell crank and the arm 80. The arm 80 is provided with a threaded hole by which it is mounted upon the threaded portion 64 of the shaft 62. The upper end of the arm 80 carries a bent finger or outer tack separating member 82 which passes through the slots 69 to co-operate with the finger or separator 68.

From the above description it will be seen that the shaft 62 is maintained in fixed longitudinal position by the clamp collar 72 abutting against the bearing lug 58 and the hub 67 of the knurled head 65 abutting against the other bearing lug 60.

From an inspection of the drawings, particularly Fig. 3, it will be seen that rotation of the knurled head 65 will cause the arm 80, carrying the separator 82, to move longitudinally of the raceway and that, when the proper adjustment has been secured, the clamp screw 74 may be tightened to lock this adjustment. As the two separators are rotatively fixed relatively to each other by the pin 78 and, as the arm carrying one of them is now clamped to the shaft 62, they and the shaft must all oscillate in unison about the center of the shaft 62 as an axis.

The tension spring 54, which is mounted between a pin 84 on the raceway and a lug 86 on the arm 70 of the bell crank lever, maintains the separating members to the right, as shown in Figs. 1 and 3. When the guide block 42 is depressed by the magnetic implement 40 being brought into engagement therewith, the arm 48 swings about the pivot 50 and causes the extension 52, which is in engagement with the lug 86, to revolve the separator mechanism left-handedly, (as viewed in Figures 1 and 3) to withdraw the separator 68 in the slots 69 from engagement with the lowermost of the group of tacks above it in the raceway, causing that tack to descend in the raceway slightly and come into engagement with the separator 82. When the implement is withdrawn, the spring 54 returns the guide or block 42 and the separator mechanism to normal position, allowing the front end 88 of the separator 68 to come between the lowermost and following tack in the raceway, forcing the lowermost tack down the raceway where it is then stopped in the position occupied by the tack just withdrawn by the magnetic implement 40. This position is indicated by the tack 46 in Fig. 1. The tack is stopped, in proper position to be received by the magnetic implement, by a depending portion 90 of the guide 42, which depending portion is freely movable in the slot in the raceway and aids in maintaining the guide 42 in a central position relatively thereto.

It will, of course, be understood that at least the lower part of the raceway, the separator members, and the guiding means for the magnetic implement are made of non-magnetic material.

Having thus described my invention, what I claim as new and desire to secure by Letters Patent of the United States is:

1. A positioning device for guiding a portable magnetic implement into fastening receiving position relative to a raceway, having, in combination, a movable implement guide, means for determining the path of travel of the guide, and means for returning the guide to normal position.

2. A positioning device for guiding a portable magnetic implement into fastening receiving position relative to a raceway, having in combination, a movable implement guide, pivoted supporting members for the guide, a spring for returning the guide to normal position, and means to position individual fastenings relative to the guide so that they will be received by said implement.

3. A positioning device for guiding a portable magnetic implement into fastening receiving position relative to a raceway, having, in combination, a raceway, a depressible implement guide, pivoted supporting members for the guide, a spring for returning the guide to normal position, and a member movable with the guide and guided by the raceway, said member having a surface to serve as a stop to position the fastening to be received.

4. A device for supplying fastenings comprising a raceway, a separator arranged to control fastenings in the raceway and to permit them to pass one by one to a point where they may be received by a magnetic implement, a movable positioning device for guiding a portable magnetic implement into fastening receiving position, and connections between the separator and said device to cause movement of the implement into and out of fastening receiving position to effect operation of the separator.

5. A device for supplying fastenings comprising a fixed raceway, a separator arranged to control fastenings in the raceway and to permit them to pass one by one to a point where they may be received by a magnetic implement, a positioning device mounted on the raceway, and movable relatively thereto for guiding a portable magnetic implement into fastening receiving position, and connections between the separator and said device to cause movement of the implement into and out of fastening receiving position to effect operation of the separator.

6. A movable positioning device for guiding a portable magnetic implement into fastening receiving position relative to a raceway, having in combination, a raceway, a guide block, a frusto-conical implement guiding and receiving aperture in the block, means for guiding the block from implement receiving position to a position adjacent to and above the raceway, from which position the implement may receive a fastening, means for returning the block to implement receiving position, and means for supplying a single fastening to the fastening receiving position for each cycle of movement of the guide block.

7. A fastening separating mechanism comprising a plurality of fastening separating members, a pivot for said members, means for moving the members in unison about the pivot, and a single means for adjusting the relative positions of the members to provide an adjustable space through which a fastening may pass.

8. A fastening separating mechanism comprising a plurality of relatively adjustable fastening separating members, a pivot for said members, means for maintaining said fastening separating members in a predetermined angular relation to each other, both while in operation and while their relative position is being adjusted, means for moving the members in unison about the pivot, and means for adjusting the relative position of the members longitudinally on the pivot to provide an adjustable space through which a fastening may pass.

9. A fastening separating mechanism comprising a pair of fastening separating members one of which is threaded, a pivot shaft for said members, the pivot shaft having a threaded portion upon which portion the threaded separating member is mounted, means for rotating the shaft and thereby adjusting longitudinally the threaded member on the threaded portion of the shaft, means for securing the shaft in adjusted position to the other member, and means to prevent relative rotation between the members.

In testimony whereof I have signed my name to this specification.

RENÉ E. DUPLESSIS.